United States Patent
Li et al.

(10) Patent No.: US 12,158,173 B2
(45) Date of Patent: Dec. 3, 2024

(54) CLAMPING COMPONENT, GUIDE RAIL RACKING AND SOLAR PANEL RACKING ASSEMBLY

(71) Applicant: GREENEC CORP., Aurora, IL (US)

(72) Inventors: Fugen Li, Fujian (CN); Binglong Zeng, Fujian (CN); Zhiwei Shi, Fujian (CN)

( * ) Notice: Subject to any disclaimer, the term of this patent is extended or adjusted under 35 U.S.C. 154(b) by 0 days.

(21) Appl. No.: 18/331,712

(22) Filed: Jun. 8, 2023

(65) Prior Publication Data
US 2024/0309896 A1 Sep. 19, 2024

(30) Foreign Application Priority Data
Mar. 15, 2023 (CN) .......................... 202320500036.0

(51) Int. Cl.
| | |
|---|---|
| F16B 2/00 | (2006.01) |
| F16B 2/06 | (2006.01) |
| F16M 13/02 | (2006.01) |
| H02S 20/00 | (2014.01) |
| H02S 20/20 | (2014.01) |
| F24S 25/60 | (2018.01) |
| H02S 20/23 | (2014.01) |

(52) U.S. Cl.
CPC .............. *F16B 2/065* (2013.01); *H02S 20/20* (2014.12); *F16B 2/00* (2013.01); *F16M 13/02* (2013.01); *F16M 13/022* (2013.01); *F24S 25/60* (2018.05); *F24S 2025/6006* (2018.05); *H02S 20/23* (2014.12)

(58) Field of Classification Search
CPC ... F16B 2/065; F16B 2/20; F16B 2/02; F16M 13/022; H02S 20/20; H02S 20/23; H02S 20/00; H02S 30/00; F24S 25/636; F24S 25/61; F24S 25/632; B23P 19/04
See application file for complete search history.

(56) References Cited

U.S. PATENT DOCUMENTS

| | | | |
|---|---|---|---|
| 8,875,401 B2 * | 11/2014 | Jolley | F24S 25/632 29/897 |
| 9,893,677 B1 * | 2/2018 | Liu | H02S 20/23 |
| 10,749,459 B1 * | 8/2020 | Liu | F16B 5/0685 |
| 11,296,648 B1 * | 4/2022 | Jasmin | F16B 5/0233 |

(Continued)

FOREIGN PATENT DOCUMENTS

CN 206575358 U * 10/2017

*Primary Examiner* — Tan Le

(57) ABSTRACT

The present application discloses a clamping component, it includes a first pressing block provided with a first perforation hole and a first clamping slot, a second pressing block provided with a second perforation hole and a second clamping slot, a fastener assembly and an elastic part. The clamping component may quickly clamp a guide rail and is suitable for different specifications of the guide rail, and the universality is high. The present application discloses a guide rail racking, including a fixing frame and the above clamping component mounted on the fixing frame. The guide rail racking is beneficial to rapid installation of the guide rail, time-saving and labor-saving. The present application discloses a solar panel racking assembly, including the above guide rail racking and a guide rail mounted on the guide rail racking. The solar panel racking assembly may be quickly assembled on site, and it is time-saving and labor-saving.

9 Claims, 11 Drawing Sheets

(56) References Cited

U.S. PATENT DOCUMENTS

| | | | |
|---|---|---|---|
| 11,313,591 B1* | 4/2022 | Atia | F24S 25/636 |
| 11,757,400 B1* | 9/2023 | Jasmin | H02S 20/23 |
| | | | 248/237 |
| 2021/0285689 A1* | 9/2021 | Affentranger, Jr. | H02S 30/00 |

* cited by examiner

CLAMPING COMPONENT, GUIDE RAIL RACKING AND SOLAR PANEL RACKING ASSEMBLY

TECHNICAL FIELD

The present application relates to the technical field of solar panel racking assembly, in particular to a clamping component, a guide rail racking, and a solar panel racking assembly.

BACKGROUND

Solar panels are a core part of a solar power generation system. A solar panel racking assembly is a special assembly designed for setting up, mounting, and fixing the solar panels in the solar power generation system.

For example, an application with application number of CN201720863230.X discloses a photovoltaic racking assembly, and its structure includes a mounting base plate, a waterproof pad, a guide rail, an L support foot, a self-tapping screw, a mid clamp, and an end clamp. The waterproof pad is mounted on the surface of the mounting base plate, one end of the L support foot is connected with the guide rail by a T-shape bolt, and the other end is connected with the waterproof pad. The mid clamp is mounted above the guide rail by a bolt, one end of the end clamp is tightly fastened with a solar panel, and the other end is mounted on a surface of the guide rail by the self-tapping screw. For another example, an application with application number of CN202220131667.5 discloses a roof solar panel mounting beam structural part. The guide rails of the above two types of solar panel racking assembly are directly fixed on the L support feet/racking assembly by screws/bolts. During on-site installation, tools need to be used to tighten each screw/bolt, the operation is cumbersome, and the installation is time-consuming relatively.

An application with application number of CN201210558642.4 discloses a roof mounting structure for a solar panel and a mounting method thereof. The solar panel racking assembly adopts a form of bolt+fixture block to mount the guide rail. While the above mounting structure is mounted on site, the bolt and the fixture block need to be disassembled before assembly. The mounting mode is not easy and time-consuming relatively, and the guide rail needs to have a laterally arranged cavity matching with the bolt, the difficulty of machining the guide rail is increased, and the total cost is high relatively.

SUMMARY

A purpose of the present application is to provide a clamping component for guide rail, it is easy and time-saving for quick mounting of a guide rail and reduces installation cost.

In order to achieve the above purpose, technical schemes provided by the present application are as follows.

A clamping component includes a first pressing block, a second pressing block, a fastener assembly and an elastic part. Herein, the first pressing block is provided with a first perforation hole and a first clamping slot, and the second pressing block is provided with a second perforation hole and a second clamping slot. The fastener assembly includes a rod portion, a first limiting portion and a second limiting portion. The rod portion is inserted into the first perforation hole and the second perforation hole, one end of the rod portion extends out of the first perforation hole and is connected with the first limiting portion, and the other end of the rod portion extends out of the second perforation hole and is connected with the second limiting portion. The elastic part is arranged between the first pressing block and the first limiting portion to provide an axial compression force on the first pressing block, so that a guide rail is clamped between the first clamping slot and the second clamping slot.

Preferably, the second limiting portion and the rod portion are integrally formed into a bolt, and the first limiting portion is a nut. One side, away from the second pressing block, of the first pressing block is provided with a guide groove, the first limiting portion is placed inside the guide groove, the elastic part is installed between the bottom of the guide groove and the first limiting portion, and the first limiting portion may move axially in the guide groove.

Preferably, the first pressing block and the second pressing block form two opposite surfaces, one of which is set as a concave surface, and the other is set as a convex surface embedded in the concave surface, as to limit the relative rotation of the first pressing block and the second pressing block.

Preferably, the top surface of the first clamping slot is an inclined surface downwards inclined towards the direction of first pressing block, and the top surface of the second clamping slot is an inclined surface downwards inclined towards the direction of the first pressing block, so that the guide rail may be easily pressed between the first clamping slot and the second clamping slot and fixed tightly between the two clamping slots.

Preferably, the lower portions of the opposite surfaces of the second pressing block and the first pressing block are collided to form a fulcrum, and there is a gap between the upper portions of the opposite surfaces of the second pressing block and the first pressing block. Under the action of the elastic part, the first pressing block may be rotated around the fulcrum towards the direction of the second pressing block, and rotated until the upper portion of the first pressing block is collided with the upper portion of the second pressing block, as to increase a clamping force of the clamping component on the guide rail.

Preferably, the elastic part adopts a spring, the spring is sheathed on the rod portion, one end of the spring is abutted with the first pressing block, and the other end of the spring is abutted with the first limiting portion.

A guide rail racking includes a fixing frame and the above clamping components. The fixing frame is provided with a third perforation hole, the rod portion is inserted into the third perforation hole, and the second pressing block and the second limiting portion are respectively located on both sides of the fixing frame to clamp the fixing frame between the second pressing block and the second limiting portion.

Preferably, the third perforation hole is a vertical slotted hole with an insert hole at the end, the fixing frame is provided with an inserting hole communicated with the third perforation hole above the third perforation hole, and the insert hole is used for the second limiting portion to pass through.

Preferably, the second pressing block is provided with a limiting block for preventing the fastener assembly from sliding into the inserting hole.

Preferably, the second pressing block is provided with a positioning lug, and the fixing frame is vertically provided with a plurality of positioning grooves matching with the positioning lug.

A solar panel racking assembly includes a guide rail and the above guide rail racking, one side of the guide rail has a first flange plate which is clamped into the first clamping slot, and the other side of the guide rail has a second flange plate which is clamped into the second clamping slot.

By adopting the above technical schemes, the beneficial effects of the present application are as follows.

1. The clamping component of the present application pre-tightens the first pressing block and the second pressing block by the fastener assembly and the elastic part. When used, the guide rail may be directly clamped between the first clamping slot and the second clamping slot, and the spring provides the axial compression force to the first pressing block, thereby the guide rail is clamped between the first clamping slot and the second clamping slot. The installation is fast and easy, it is applicable for the installation of various types of the guide rail, and the universality is higher.

2. The guide rail racking of the present application adopts the clamping components of the present application to fix the guide rail. When used, the clamping components and the fixing frame are pre-assembled together in advance to facilitate the installation of the guide rail during on-site construction, the installation time of the guide rail is reduced, and it is time-saving and labor-saving.

3. The solar panel racking assembly of the present application adopts the guide rail racking of the present application to fix the guide rail, it is easy for on-site rapid assembly and installation, and it is time-saving and labor-saving. The guide rail is engaged with the guide rail racking by its first flange plate and second flange plate. Compared with a guide rail with a complex cross-section in current market, the guide rail of the present application has lower production difficulty, lighter weight, and less loads on buildings, such as a roof.

Herein: 1. Clamping component, 11. First pressing block, 111. First perforation hole, 112. First clamping slot, 113. Guide groove, 114. Limiting groove, 115. First inclined surface, 116. First vertical surface, 117. Second inclined surface, 118. Second vertical surface, 12. Second pressing block, 121. Second perforation hole, 122. Second clamping slot, 123. Positioning lug, 124. Limiting block, 125. Third inclined surface, 126. Third vertical surface, 127. Fourth inclined surface, 128. Fourth vertical surface, 13. Fastener assembly, 131. Rod portion, 132. First limiting portion, 133. Second limiting portion, 14. Elastic part, 2. Fixing frame, 21. Third perforation hole, 22. Positioning groove, 23. Inserting hole, 3. Guide rail, 31. First flange plate, and 32. Second flange plate.

DETAILED DESCRIPTION OF THE EMBODIMENTS

The present application is further described below in combination with drawings and specific implementation modes.

Figure 1:
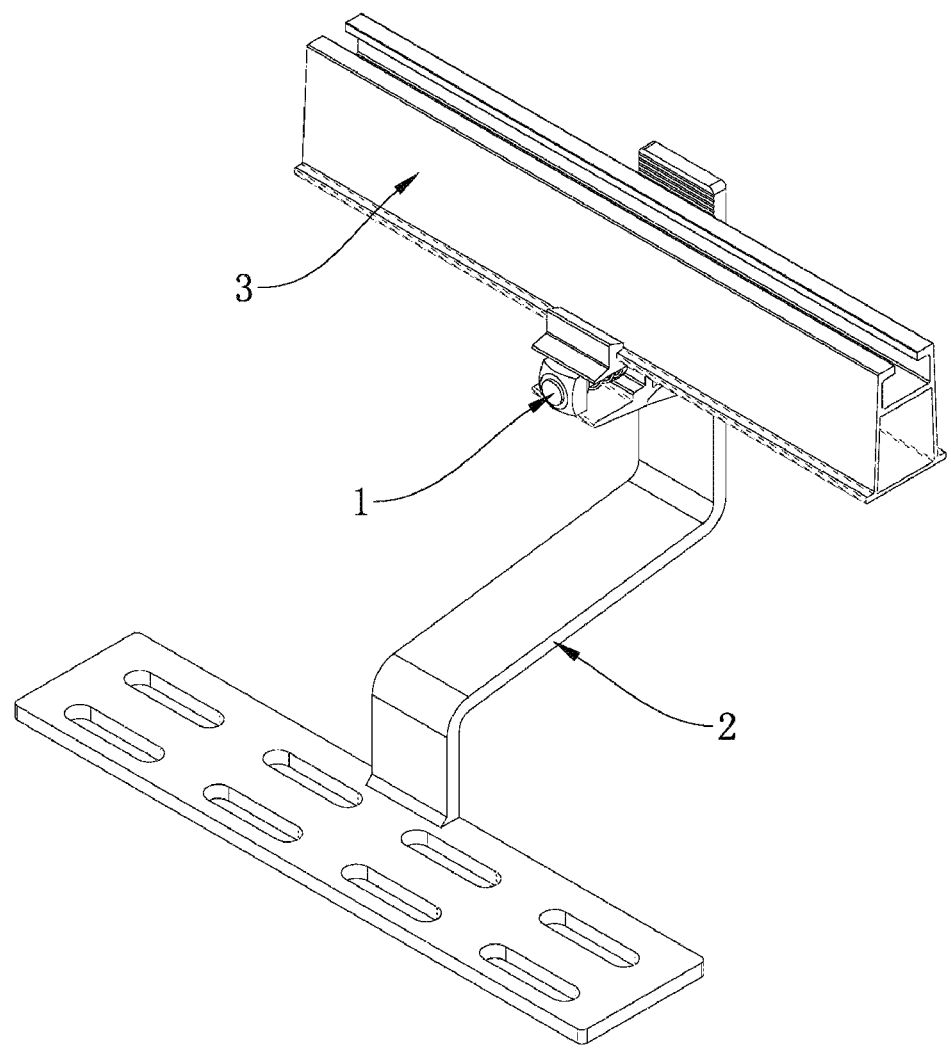
FIG. 1 is a 3D structure schematic diagram of a solar panel racking assembly in the present embodiment.
Figure 2:
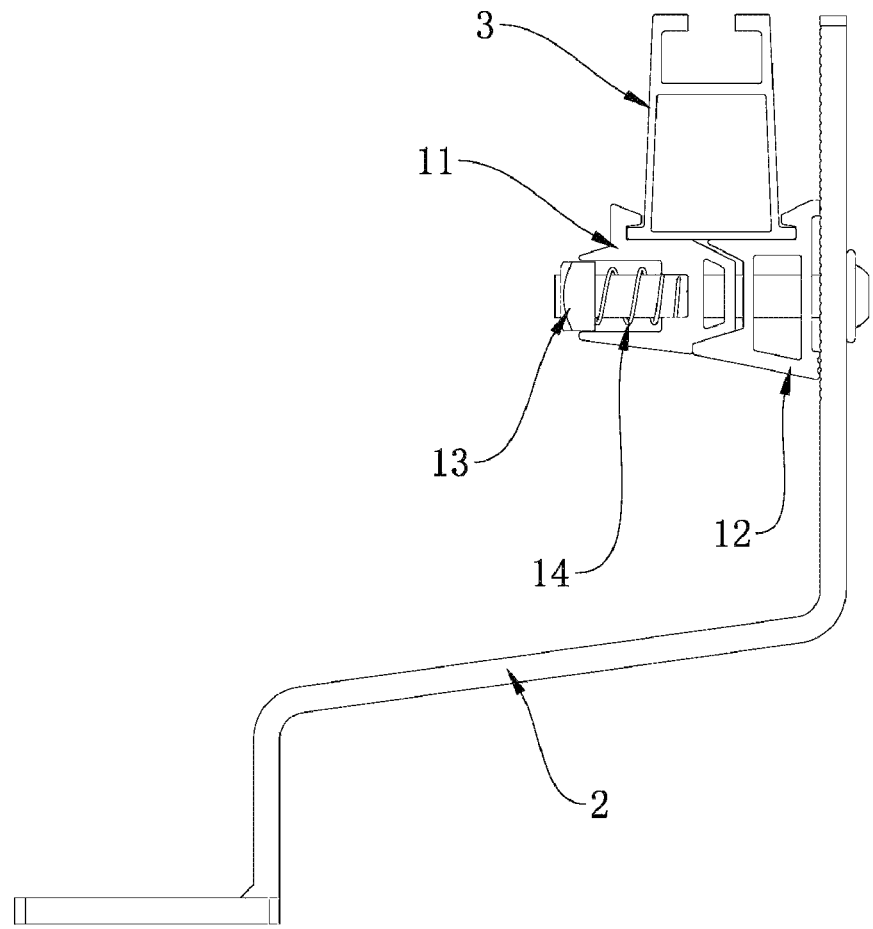
FIG. 2 is a side view schematic diagram of FIG. 1.
Figure 3:
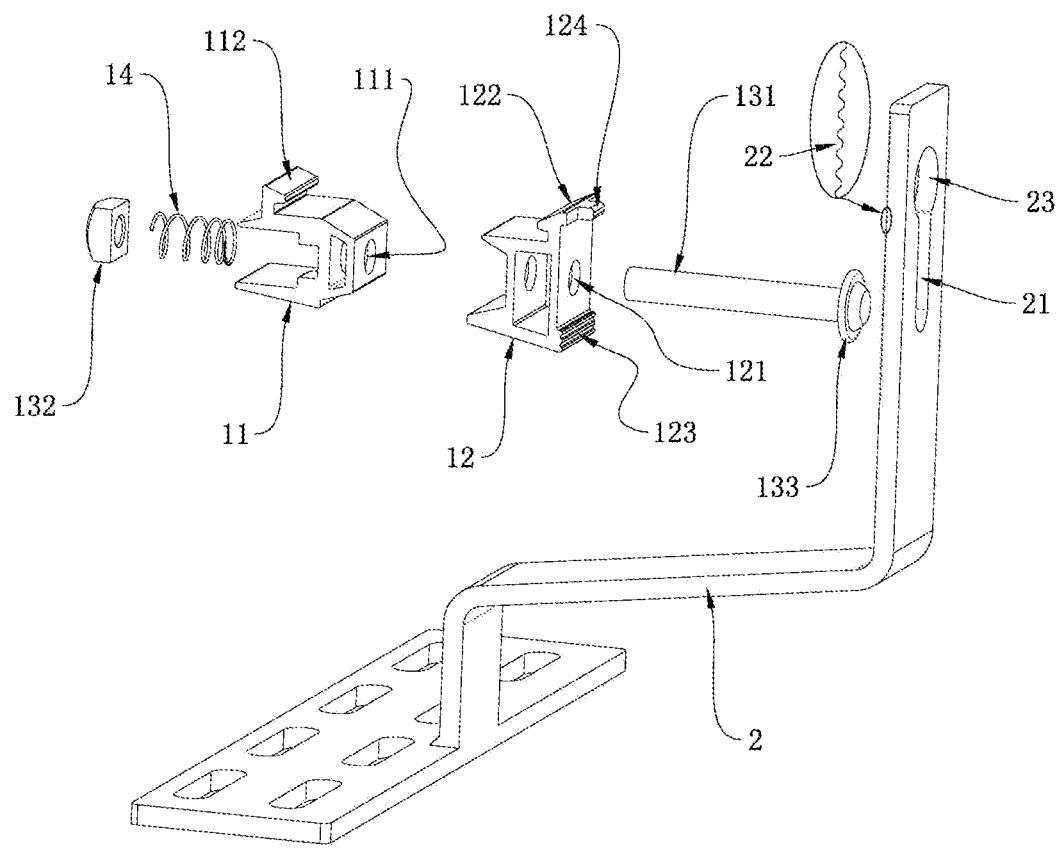
FIG. 3 is an exploded structure schematic diagram of a guide rail racking in FIG. 1.

Please refer to FIGS. 1 and 2, a solar panel racking assembly in the present embodiment includes a guide rail racking and a guide rail 3 mounted on the guide rail racking, the guide rail racking further includes a fixing frame 2 and a clamping component 1 mounted on the fixing frame 2, and the clamping component 1 is used to clamp the guide rail 3.

Please refer to FIGS. 2 to 6, the clamping component 1 of the present embodiment includes: a first pressing block 11, a second pressing block 12, a fastener assembly 13, and an elastic part 14. The first pressing block 11 is provided with a first perforation hole 111, the top surface is provided with a first clamping slot 112 with a notch orientated rightwards, the top surface of the first clamping slot 112 is high on the left and low on the right, and the right side of the first pressing block 11 is set as a convex surface. The second pressing block 12 is provided with a second perforation hole 121, the top surface is provided with a second clamping slot 122 with a notch orientated leftwards, the top surface of the second clamping slot 122 is low on the left and high on the right, and the left side of the second pressing block 12 is set as a concave surface. The fastener assembly 13 includes: a rod portion 131, a first limiting portion 132 and a second limiting portion 133. The rod portion 131 is inserted into the first perforation hole 111 and the second perforation hole 121, the left end of the rod portion 131 extends out of the first perforation hole 111 and is connected with the first limiting portion 132, and the right end of the rod portion 131 extends out of the second perforation hole 121 and is connected with the second limiting portion 133. The elastic part 14 is arranged between the first pressing block 11 and the first limiting portion 132 to provide an axial compression force to the first pressing block 11, so that the first pressing block 11 and the second pressing block 12 are collided, and the second pressing block 12 and the second limiting portion 133 are collided.

In the present embodiment, opposite surfaces of the first pressing block 11 and the second pressing block 12 are designed as the convex surface and the concave surface, the relative rotation of the first pressing block 11 and the second pressing block 12 may be limited, and it is guaranteed that the notches of the first clamping slot 112 and the second clamping slot 122 are opposite, so as not to affect the installation of the guide rail 3. The top surface of the first clamping slot 112 is designed as high on the left and low on the right, and the top surface of the second clamping slot 122 is designed as low on the left and high on the right, so an inverted splayed guiding structure is formed. The structure helps the guide rail 3 to be pressed from top to bottom between the first clamping slot 112 and the second clamping slot 122, it is time-saving and labor-saving.

The fixing frame 2 of the present embodiment may be a hook, an L-angle and so on. The bottom end of the fixing frame 2 is used to connect with buildings such as a roof, and the upper end of the fixing frame 2 is provided with a third perforation hole 21. The rod portion 131 of the fastener assembly 13 is inserted into the third perforation hole 21, and the second pressing block 12 and the second limiting portion 133 are respectively located on both sides of the fixing frame 2. Under the pre-tightening effect of the elastic part 14, the fixing frame 2 is clamped between the second pressing block 12 and the second limiting portion 133, thereby the clamping component 1 is fixed on the fixing frame 2.

Since the clamping component 1 is mainly located on one side of the fixing frame 2, after the guide rail 3 is mounted, the clamping component 1 may be skewed to the bottom left under the effect of a lateral force. In order to eliminate this effect, the bottom surface of the second pressing block 12 may be designed to be high on the left and low on the right, so that after the guide rail 3 is mounted, the clamping component 1 is kept horizontally.

Figure 8:
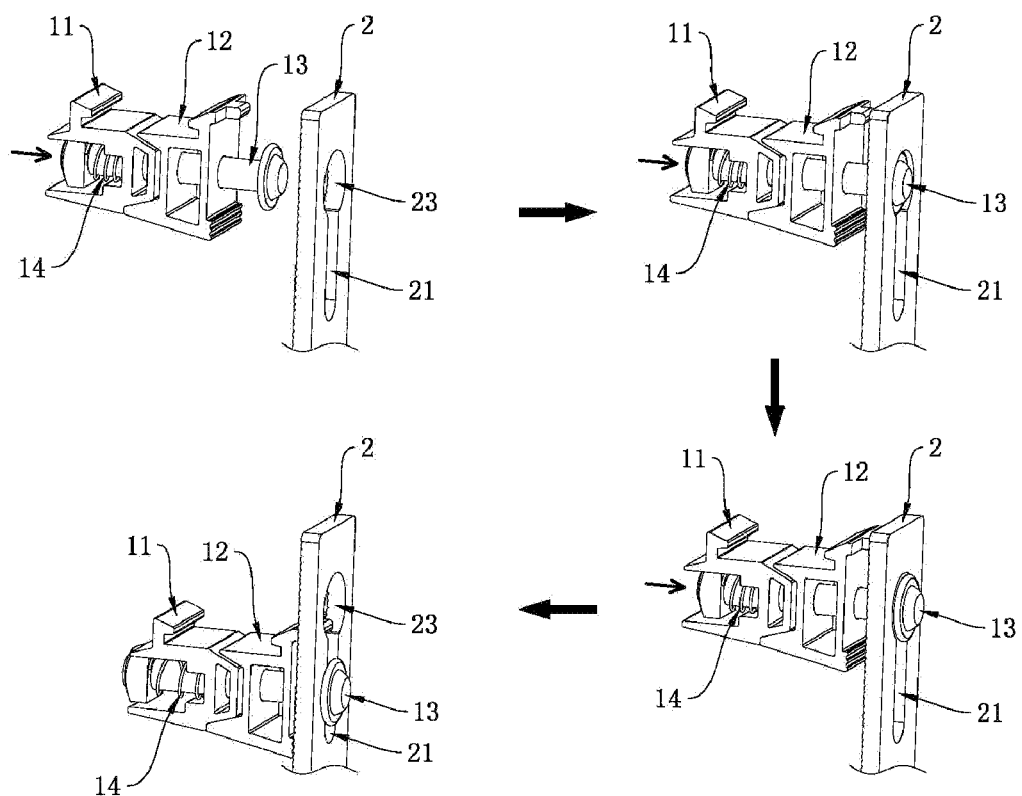
FIG. 8 is a schematic diagram of installation steps of a guide rail racking in the present embodiment.
Figure 11:
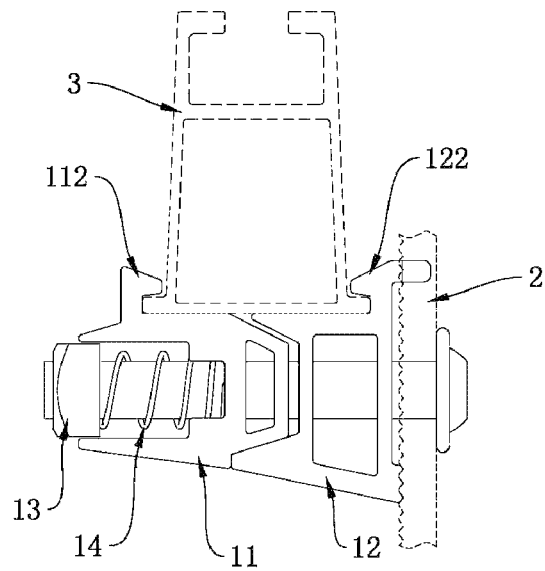
FIG. 11 is a state schematic diagram of the clamping components of the present embodiment clamping different types of guide rails.
Figure 11:
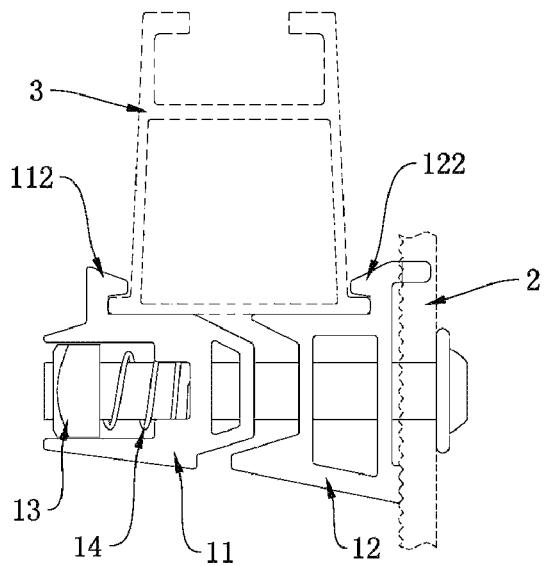

In order to easily mount the clamping component 1 on the fixing frame 2, the present embodiment has the third perforation hole 21, which a vertical slotted hole with an inserting hole 23 at the end. In order to prevent the clamping component 1 from sliding upwards out of the inserting hole 23 after being mounted on the fixing frame 2, the right side of the secondary pressing 12 is provided with a limiting block 124, and the limiting block 124 is used to prevent the fastener assembly 13 from sliding into the inserting hole 23. Please refer to FIG. 8, during assembly, one hand may hold the clamping component 1, while the other hand presses the fastener assembly 13 from the left side so as to compress the elastic part 14. The fastener assembly 13 extends to the right, and then the fastener assembly 13 is inserted into the inserting hole 23, so that the second limiting portion 133 passes through the inserting hole 23, then the clamping component 1 is moved downwards, so that the limiting block 124 is inserted into the third perforation hole 21, lastly stop pressing the fastener assembly, so that the fixing frame 2 is clamped between the second limiting portion 133 and the second pressing block 12, as shown in FIG. 11. At this time, the limiting block 124 may also limit the rotation of the clamping component 1 relative to the fixing frame 2.

In order to achieve the adjustment of the setting height of the guide rail 3, the right side of the second pressing block 12 may be designed with a positioning lug 123, a vertical positioning groove 22 may be produced on the fixing frame 2, and the positioning lug 123 and the positioning groove 22 may adopt corrugated structures that may be embedded with each other. The positioning lug 123 and the positioning groove 22 may fit the clamping component 1 with the fixing frame 2 better, and the clamping component 1 may be prevented from rotating relative to the fixing frame 2.

In order to guarantee that the clamping component 1 may not slide down again after being mounted to a predetermined height, the rod portion 131 and the second limiting portion 133 of the present embodiment are composed of a bolt, and the first limiting portion 132 is a nut. The use of the bolt and the nut is easy for the assembly of the clamping component 1, and the nut may be tightened as needed to compress the elastic part 14, the axial compression force of the elastic part 14 against the first pressing block 11 is increased, thereby the clamping strength of the clamping component 1 against the guide rail 3 is increased. At the same time, the fixing frame 2 is clamped between the second pressing block 12 and the second limiting portion 133 to prevent the clamping component 1 from sliding downwards. In order to tighten the bolt and the nut, the left side of the first pressing block 11 may be provided with a guide groove 113, so that the first limiting portion 132 is clamped in the guide groove 113, and the first limiting portion 132 may be moved axially in the guide groove 113 but may not be rotated circumferentially. At this time, an electric screwdriver/screwdriver tools are used to rotate the bolt with one hand to tighten the bolt and the nut, it is easier, faster, more time-saving and labor-saving. The bolt preferably adopts a flange bolt, the flange bolt has greater support area than a plain bolt, and it may withstand the higher pre-tightening force, and has the better anti-loosening performance.

In the present embodiment, the elastic part 14 adopts a spring sheathed on the rod portion 131. In order to avoid excessive tightening of the bolt and the nut which may exceed the elastic limit of the spring and damage the spring, the bottom of the guide groove 113 may be provided with a limiting groove 114, so that the spring is abutted between the bottom of the limiting groove 114 and the first limiting portion 132. The groove depth of the limiting groove 114 should not be less than the minimum length of the spring compressed, so that the bottom of the guide groove 113 may limit the nut from excessively fastening and compressing the spring.

Figure 7:
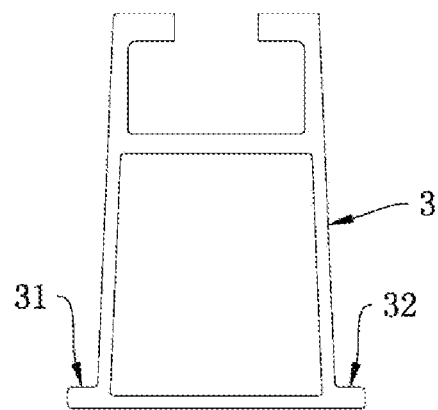
FIG. 7 is a side view schematic diagram of a guide rail in the present embodiment.
Figure 9:
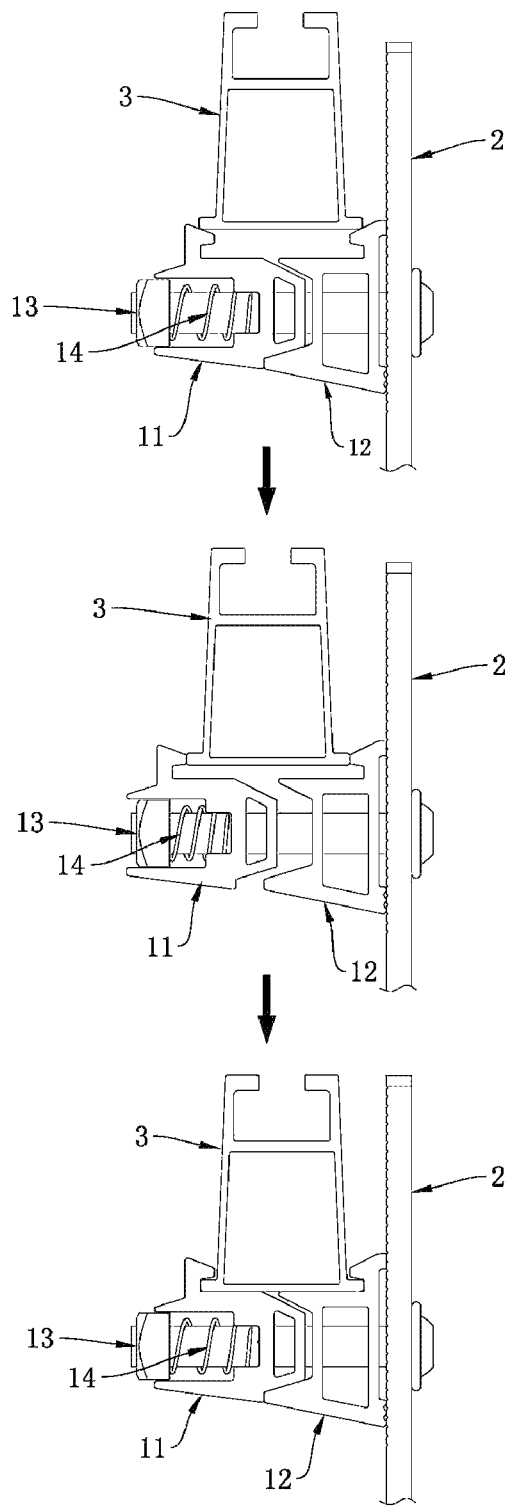
FIG. 9 is a schematic diagram of installation steps of a solar panel racking assembly in the present embodiment.

Please refer to FIGS. 7 and 9, the guide rail 3 of the present embodiment is engaged with the clamping component 1, the left side of the guide rail 3 has a first flange plate 31 that may be inserted into the first clamping slot 112, the right side of the guide rail 3 has a second flange plate 32 that may be inserted into the second clamping slot 122, and the top of the guide rail 3 has a clamping slot for mounting an end clamp. In the process of clamping the guide rail 3 downwards into the clamping component 1, the guide rail 3 is firstly squeezed between the first pressing block 11 and the second pressing block 12, so that the first pressing block 11 is moved leftwards, and the spring is compressed. Subsequently, the first flange plate 31 is clamped into the first clamping slot 112, the second flange plate 32 is clamped into the second clamping slot 122, and the spring is reset, so that the guide rail 3 is clamped between the first pressing block 11 and the second pressing block 12, the displacement and deviation are avoided during the installation of the guide rail 3. The structure of the guide rail 3 in the present embodiment is simpler, the machining difficulty is lower, and the weight is light, so it is beneficial for reducing the weight of buildings such as a roof, and the production cost is also lower.

Figure 4:
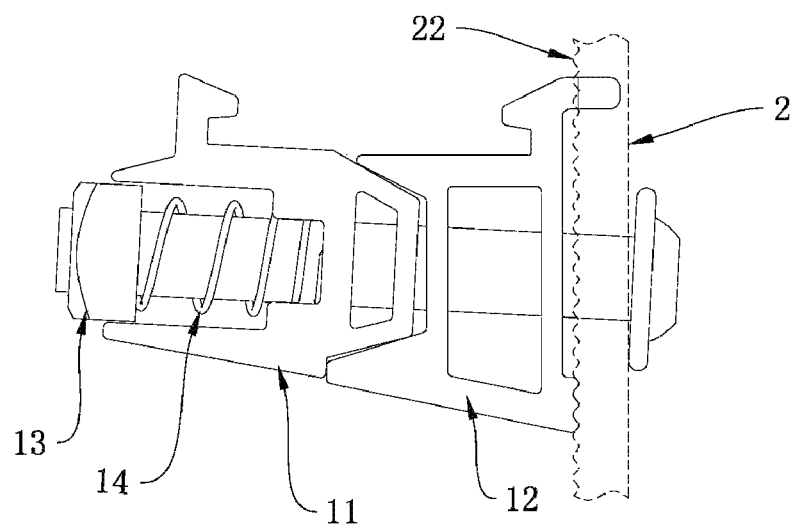
FIG. 4 is a side view schematic diagram of a clamping component in the present embodiment.
Figure 5:
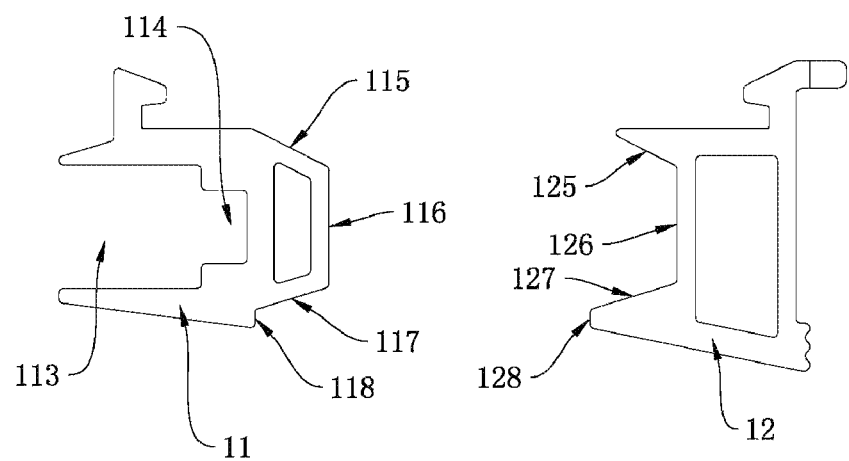
FIG. 5 is a side view schematic diagram of a first pressing block and a second pressing block in the embodiment.
Figure 6:
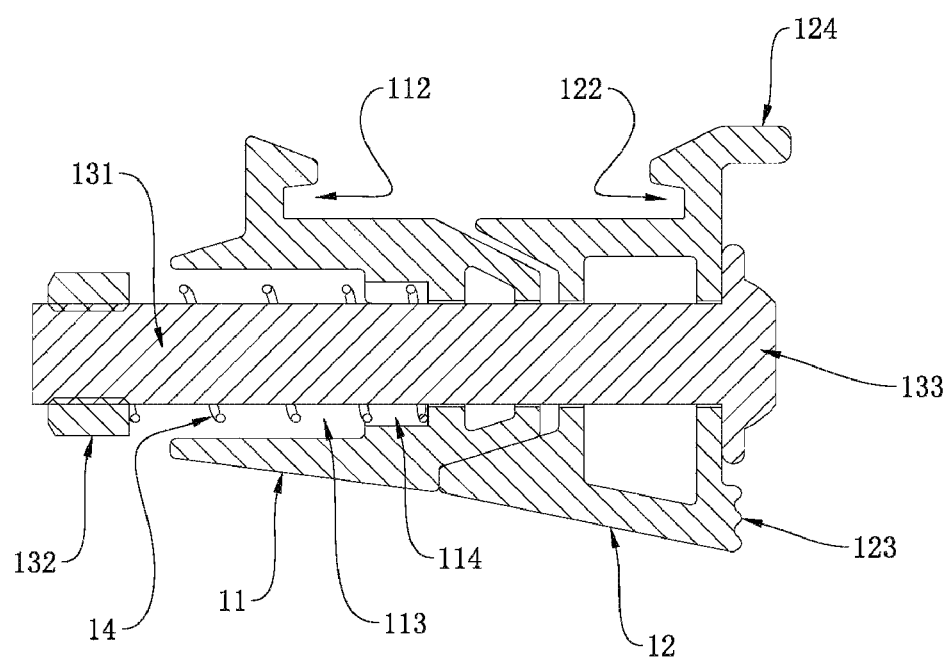
FIG. 6 is a section view schematic diagram of the clamping components in the present embodiment.

Please refer to FIGS. 4 and 5, the right side of the first pressing block 11 in the present embodiment successively includes a first inclined surface 115, a first vertical surface 116, a second inclined surface 117 and a second vertical surface 118 from top to bottom. The left side of the second pressing block 12 successively includes a third inclined surface 125 opposite to the first inclined surface 115, a third vertical surface 126 opposite to the first vertical surface 116, a fourth inclined surface 127 opposite the second inclined surface 117 and a fourth vertical surface 128 opposite the second vertical surface 118 from top to bottom. The first perforation hole 111 is located at the first vertical surface 116, and the second perforation hole 121 is located at the third vertical surface 126. While the second inclined surface 117 is overlapped with the fourth inclined surface 127, there is a gap between the first inclined surface 115 and the third inclined surface 125, and there is a gap between the second vertical surface 118 and the third vertical surface 126. In an initial state, the lower portion of the left side of the second pressing block 12 and the lower portion of the right side of the first pressing block 11 are collided to form a fulcrum, and there is a gap between the upper portion of the left side of the second pressing block 12 and the upper portion of the right side of the first pressing block 11. Under the action of the elastic part 14, the first pressing block 11 may be rotated rightwards around the fulcrum, and rotated until the upper portion of the first pressing block 11 is collided with the upper portion of the second pressing block 12, thereby the clamping force of the clamping component 1 is increased. At the same time, it is beneficial to eliminate the machining tolerance of the first pressing block 11 and the second pressing block 12, and the machining difficulty is reduced.

Figure 10:
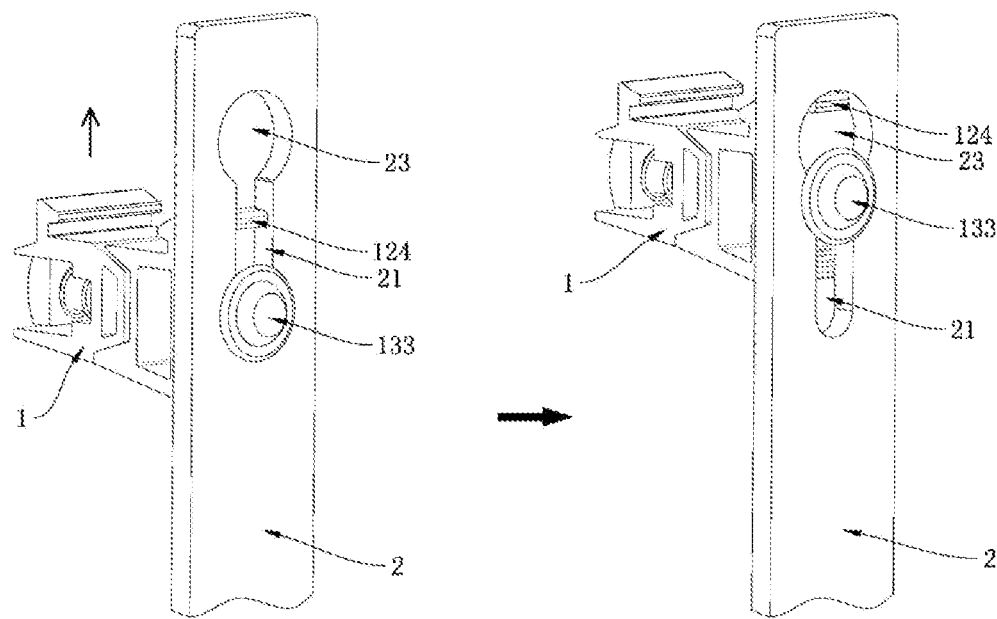
FIG. 10 is a structure schematic diagram of the clamping components sliding upwards in a third perforation hole of the present embodiment.

Please refer to FIG. 10, the distance between the first pressing block 11 and the second pressing block 12 of the clamping component 1 in the present embodiment is adjustable, it may adapt to different specifications of the guide rail 3, and the universality is higher. Compared to amounting structure of bolt+fixture block, the present application does not require the guide rail 3 to have a lateral cavity. Therefore, the machining difficulty and cost of the guide rail 3 may be reduced. At the same time, compared to the installation by simply using bolts and nuts, the present application is simple in operation, and may be assembled with any location of a rail, it is beneficial to the rapid installation and adjustment of the guide rail 3, and is more time-saving and labor-saving during on-site construction.

In the descriptions of the present application, the orientation or position relationship indicated by terms "left", "right" and the like is an orientation or position relationship based on the drawings, it is only for the purpose of describing the present application and does not require the present application to be necessarily constructed or operated in a specific orientation. Therefore, it may not be interpreted as limitation to the present application.

Although the present application is specifically demonstrated and introduced in combination with preferred implementation schemes, those skilled in the art should understand that within the spirit and scope of the present application, various all changes made in forms shape and details to the present application without departing from definitions in the appended claims shall be the scope of protection of the present application.

The invention claimed is:

1. A clamping component, comprising:
a first pressing block (11), provided with a first perforation hole (111) and a first clamping slot (112);
a second pressing block (12), provided with a second perforation hole (121) and a second clamping slot (122), wherein notches of the second clamping slot (122) and the first clamping slot (112) are opposite;
a fastener assembly (13), comprising: a rod portion (131), a first limiting portion (132) and a second limiting portion (133), wherein the rod portion (131) is inserted into the first perforation hole (111) and the second perforation hole (121), one end of the rod portion (131) extends out of the first perforation hole (111) and is connected with the first limiting portion (132), and the other end of the rod portion (131) extends out of the second perforation hole (121) and is connected with the second limiting portion (133); and
an elastic part (14), arranged installed between the first pressing block (11) and the first limiting portion (132) to provide an axial compression force to the first pressing block (11).

2. The clamping component as claimed in claim 1, wherein the second pressing block (12) is provided with a positioning lug (123).

3. The clamping component as claimed in claim 1, wherein the second limiting portion (133) and the rod portion (131) are integrally formed into a bolt, and the first limiting portion (132) is a nut; the first pressing block (11) is provided with a guide groove (113), the first limiting portion (132) is clamped in the guide groove (113), the elastic part (14) is abutted between the bottom of the guide groove (113) and the first limiting portion (132), and the first limiting portion (132) may be moved axially in the guide groove (113).

4. The clamping component as claimed in claim 3, wherein the first pressing block (11) is provided with a limiting groove (114) at the bottom of the guide groove (113), the elastic part (14) is a spring, the elastic part (14) is sheathed on the rod portion (131), one end of the elastic part (14) is abutted with the first pressing block (11), and the other end is abutted with the bottom of the limiting groove (114).

5. The clamping component as claimed in claim 1, wherein while one surface of the first pressing block (11) and one surface of the second pressing block (12) contact or approach each other, two opposite surfaces are formed, one of the opposite surfaces is set as a concave surface, and the other is set as a convex surface embedded in the concave surface.

6. The clamping component as claimed in claim 5, wherein the lower portions of the two opposite surfaces formed by the second pressing block (12) and the first pressing block (11) are collided to form a fulcrum, and there is a gap between the upper portions of the two opposite surfaces formed by the second pressing block (12) and the first pressing block (11); and under the action of the elastic part (14), the first pressing block (11) may be rotated around the fulcrum towards the direction of the second pressing block (12), and rotated until the upper portion of the first pressing block (11) is collided with the upper portion of the second pressing block (12).

7. The clamping component as claimed in claim 5, wherein in the two opposite surfaces formed by the first pressing block (11) and the second pressing block (12), one opposite surface successively comprises a first inclined surface (115), a first vertical surface (116), a second inclined surface (117) and a second vertical surface (118) from top to bottom, and the other opposite surface successively comprises a third inclined surface (125) opposite to the first inclined surface (115), a third vertical surface (126) opposite to the first vertical surface (116), a fourth inclined surface (127) opposite to the second inclined surface (117), and a fourth vertical surface (128) opposite to the second vertical surface (118) from top to bottom; and while the second inclined surface (117) is overlapped with the fourth inclined surface (127), there is a gap between the first inclined surface (115) and the third inclined surface (125), and there is a gap between the first vertical surface (116) and the third vertical surface (126).

8. The clamping component as claimed in claim 1, wherein the top surface of the first clamping slot (112) is an inclined surface downwards inclined towards the direction of the second pressing block (12), and the top surface of the second clamping slot (122) is an inclined surface downwards inclined towards the direction of the first pressing block (11).

9. The clamping component as claimed in claim 1, wherein the bottom surface of the second pressing block (12) is an inclined surface upwards inclined towards the direction of the first pressing block (11).

* * * * *